US010243866B2

(12) United States Patent
Benjamini et al.

(10) Patent No.: US 10,243,866 B2
(45) Date of Patent: Mar. 26, 2019

(54) CONTROLLING PACKET DATA TRANSMISSIONS VIA DATA TRANSMISSION MEDIA

(71) Applicant: International Business Machines Corporation, Armonk, NY (US)

(72) Inventors: Yiftach Benjamini, Givat Ela (IL); Oren Lev, Yokneam Elite (IL); Tomer Z. Metz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 15/200,169

(22) Filed: Jul. 1, 2016

(65) Prior Publication Data
US 2018/0006960 A1  Jan. 4, 2018

(51) Int. Cl.
*H04L 12/801* (2013.01)

(52) U.S. Cl.
CPC .............. *H04L 47/39* (2013.01); *H04L 47/12* (2013.01)

(58) Field of Classification Search
CPC ....... H04L 47/39; H04L 47/12; H04L 12/873; H04L 12/863; H04L 12/801; H04L 12/56; H04L 12/26; H04W 72/04; H04J 1/16
See application file for complete search history.

(56) References Cited

U.S. PATENT DOCUMENTS

| 7,330,477 | B2 | 2/2008 | Hendel et al. |
| 8,130,713 | B2 | 3/2012 | Beiroumi et al. |
| 8,400,915 | B1 | 3/2013 | Brown et al. |
| 9,755,983 | B1 | 9/2017 | Swartzentruber |
| 2003/0135449 | A1* | 7/2003 | Xu ........................ H04L 47/623 705/38 |
| 2007/0274215 | A1* | 11/2007 | Gusat ..................... H04L 1/1874 370/235 |
| 2012/0099603 | A1* | 4/2012 | Tabatabaee ........... H04L 47/522 370/412 |
| 2014/0086259 | A1* | 3/2014 | Venables ............... H04L 47/527 370/412 |

FOREIGN PATENT DOCUMENTS

| CA | 2840048 C | 12/2012 |
| WO | 2017097117 A1 | 6/2017 |

\* cited by examiner

*Primary Examiner* — Walli Butt
(74) *Attorney, Agent, or Firm* — Steven L. Fisher-Stawinski; Bryan D. Wells

(57) ABSTRACT

A computer-implemented method includes identifying a current packet data transmission credit value assigned to a packet data transmitter. The method includes identifying a value change in the current packet data transmission credit value. The baseline packet transmission credit value is for the packet data transmitter. The method is responsive to the change being a decrease by increasing a transmission opportunity weight for the packet data transmitter. The method is responsive to the change being an increase by decreasing the transmission opportunity weight for the packet data transmitter. The method includes passing to the packet data transmitter a parameter. The parameter directing the packet data transmitter to transmit packet data via data transmission circuitry during a scheduled transmission opportunity. The extent of the parameter is proportional to the transmission opportunity weight.

20 Claims, 4 Drawing Sheets

|  | Packet Data Transmission Credit Values | | | Transmission Opportunity Weights | | |
| --- | --- | --- | --- | --- | --- | --- |
|  | Posted | Non-posted | Completion | Posted | Non-posted | Completion |
| Start | 10 | 10 | 10 |  |  |  |
| Round 1 | 9 | 9 | 9 | 1 | 1 | 1 |
| Round 2 | 8 | 8 | 9 | 1 | 1 | 1 |
| Round 3 | 7 | 9 | 9 | 1 | 1 | 1 |
| Round 4 | 7 | 9 | 9 | 1 | 1 | 1 |
| Round 5 | 6 | 9 | 9 | 1 | 1 | 1 |
| Round 6 | 5 | 9 | 9 | 1 | 2 | 2 |
| Round 7 | 4 | 9 | 9 | 1 | 2 | 2 |
| Round 8 | 3 | 8 | 8 | 1 | 2 | 2 |
| Round 9 | 2 | 7 | 7 | 1 | 4 | 4 |
| Round 10 | 4 | 6 | 6 | 1 | 2 | 2 |
| Round 11 | 7 | 6 | 6 | 1 | 1 | 1 |

FIG. 3

CONTROLLING PACKET DATA TRANSMISSIONS VIA DATA TRANSMISSION MEDIA

BACKGROUND

The present invention relates generally to the field of data transmission and more particularly to packet data transmissions.

In packet data communications networks, a scheduler is typically used to manage packet data transmissions so as to maintain a steady stream of data transmissions, in accordance with the data processing throughput of the recipient of the transmissions. Various scheduling techniques have been developed, including Deficit Round Robin (DRR) which uses weights to give preference to different types of packet data transmissions.

SUMMARY

A computer-implemented method includes identifying a current packet data transmission credit value. The current packet data transmission credit value is assigned to a packet data transmitter. The method includes identifying a value change. The change is in the current packet data transmission credit value. The change is that the current packet data transmission credit value has exceeded a threshold value. The threshold value is relative to a baseline packet transmission credit value. The baseline packet transmission credit value is for the packet data transmitter. The method is responsive to the change being a decrease in the current packet data transmission credit value. The method responds by increasing a transmission opportunity weight for the packet data transmitter. The method is responsive to the change being an increase in the current packet data transmission credit value. The method responds by decreasing the transmission opportunity weight for the packet data transmitter. The method includes passing to the packet data transmitter a parameter. The parameter directing the packet data transmitter to transmit packet data via data transmission circuitry during a scheduled transmission opportunity. The extent of the parameter is proportional to the transmission opportunity weight.

A computer program product includes one or more computer readable storage media and program instructions stored on the one or more computer readable storage media. The computer program product includes instructions to identify a current packet data transmission credit value. The current packet data transmission credit value is assigned to a packet data transmitter. The computer program product includes instructions to identify a value change. The change is in the current packet data transmission credit value. The change is that the current packet data transmission credit value has exceeded a threshold value. The threshold value is relative to a baseline packet transmission credit value. The baseline packet transmission credit value is for the packet data transmitter. The computer program product is responsive to the change being a decrease in the current packet data transmission credit value. The computer program product includes instructions to increase a transmission opportunity weight for the packet data transmitter. The computer program product is responsive to the change being an increase in the current packet data transmission credit value. The computer program product includes instructions to decrease the transmission opportunity weight for the packet data transmitter. The computer program product includes instructions to pass to the packet data transmitter a parameter. The parameter directing the packet data transmitter to transmit packet data via data transmission circuitry during a scheduled transmission opportunity. The extent of the parameter is proportional to the transmission opportunity weight.

A computer system includes one or more computer processors. The computer system includes one or more computer readable storage media. The computer system includes computer program instructions. The computer program instructions are stored on the computer readable storage media for execution by at least one of the one or more processors. The computer program instructions include instructions to identify a current packet data transmission credit value. The current packet data transmission credit value is assigned to a packet data transmitter. The computer program instructions include instructions to identify a value change. The change is in the current packet data transmission credit value. The change is that the current packet data transmission credit value has exceeded a threshold value. The threshold value is relative to a baseline packet transmission credit value. The baseline packet transmission credit value is for the packet data transmitter. The computer system is responsive to the change being a decrease in the current packet data transmission credit value. The computer program instructions include instructions to increase a transmission opportunity weight for the packet data transmitter. The computer system is responsive to the change being an increase in the current packet data transmission credit value. The computer program instructions include instructions to decrease the transmission opportunity weight for the packet data transmitter. The computer program instructions include instructions to pass to the packet data transmitter a parameter. The parameter directing the packet data transmitter to transmit packet data via data transmission circuitry during a scheduled transmission opportunity. The extent of the parameter is proportional to the transmission opportunity weight.

BRIEF DESCRIPTION OF THE DRAWINGS

FIG. 3 is an exemplary data table illustrating the organizational structure of FIG. 1 and the operational steps of FIG. 2, in accordance with at least one embodiment of the present invention.

DETAILED DESCRIPTION

Figure 1:
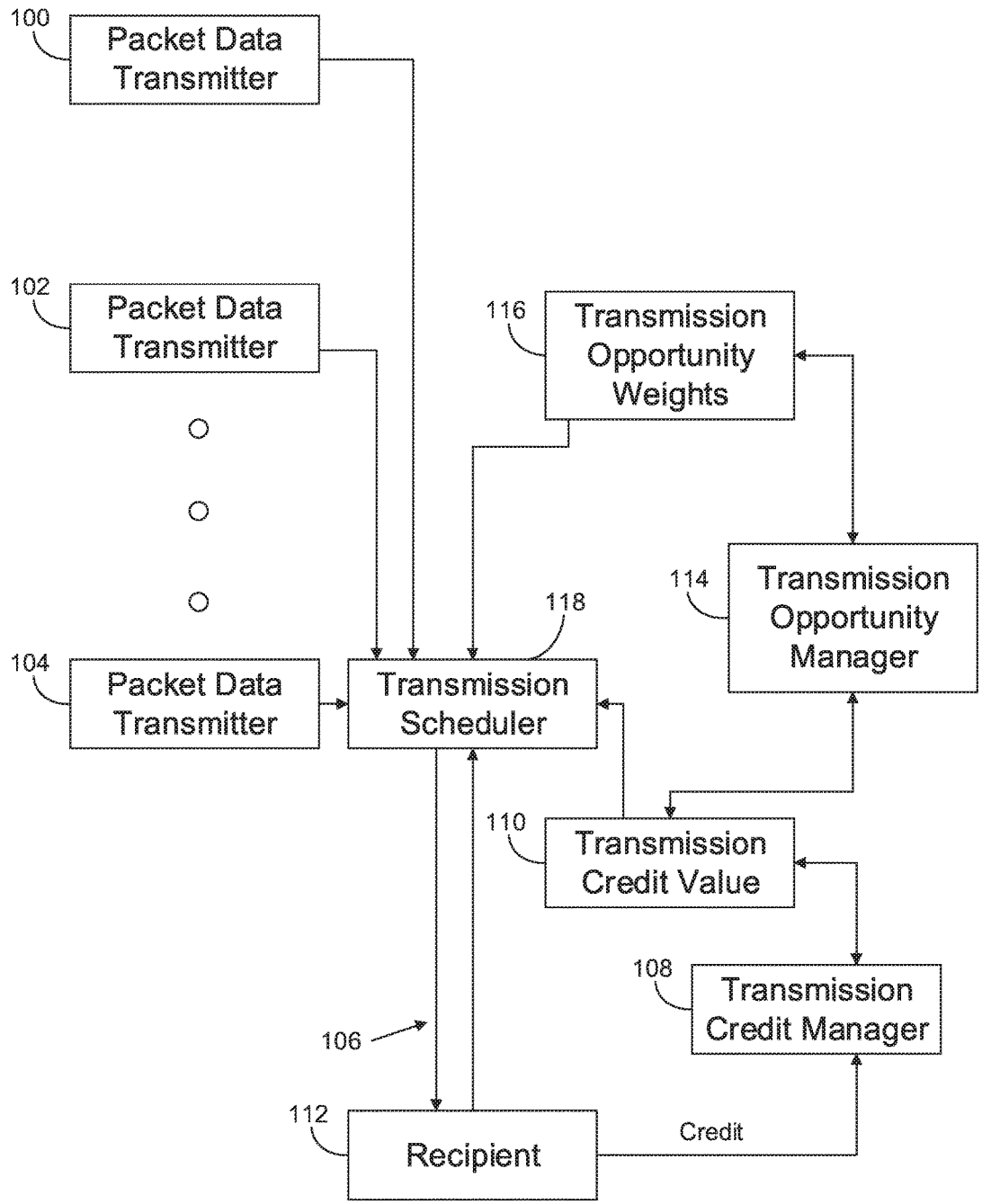
FIG. 1 depicts a block diagram of a transmission scheduler for controlling packet data transmissions via data transmission media, constructed and operative, in accordance with at least one embodiment of the present invention.

Referring now to the invention in more detail, FIG. 1, which depicts a transmission scheduler 118 for controlling packet data transmissions via data transmission media, constructed and operative, in accordance with an embodiment of the invention. A group of packet data transmitters is shown including packet data transmitters 100, 102, and 104, although it is appreciated that larger or smaller groups of packet data transmitters may be accommodated. Packet data transmitters 100, 102, and 104 are configured to transmit packet data via data transmission circuitry 106. Packet data transmitters 100, 102, and 104 may, for example, represent posted, non-posted, and response channels respectively in a Peripheral Component Interconnect Express (PCIe) computer architecture, where packet data transmitters 100, 102, and 104 transmit packet data via a high-speed serial computer expansion bus.

A credit manager 108 is configured to maintain, in a list of packet data transmission credit values 110, a separate current packet data transmission credit value for each of packet data transmitters 100, 102, and 104 with respect to packet data that are transmitted by packet data transmitters 100, 102, and 104 a recipient 112. The packet data transmission credit values may, for example, be assigned by, and received from, recipient 112, such as where recipient 112 sets and periodically changes the packet data transmission credit values, in accordance with conventional techniques based on its ability to process different types of packet data received from packet data transmitters 100, 102, and 104 at different times. Thus, for example, the current packet data transmission credit values for packet data transmitters 100, 102, and 104 with respect to recipient 112 may be 7 data packets, 8 data packets, and 3 data packets, respectively, indicating that packet data transmitter 100 is allowed to transmit 7 data packets to recipient 112, packet data transmitter 102 is allowed to transmit 8 data packets to recipient 112, and packet data transmitter 104 is allowed to transmit 3 data packets to recipient 112.

A transmission opportunity manager 114 is configured to maintain, such as in the list of packet data transmission credit values 110, a separate baseline packet data transmission credit value for each of packet data transmitters 100, 102, and 104 with respect to recipient 112, which may, for example, represent starting credit values, target credit values, or maximum credit values. Thus, in the current example, the baseline packet data transmission credit values for packet data transmitters 100, 102, and 104 may be 10 data packets, 12 data packets, and 14 data packets, respectively. Transmission opportunity manager 114 is also configured to maintain, or otherwise calculate, one or more threshold values relative to the baseline packet transmission credit values. Thus, in the current example, transmission opportunity manager 114 may establish threshold values at 50% and 25% of the baseline packet data transmission credit values for packet data transmitters 100, 102, and 104, or 5 and 2.5 for packet data transmitter 100, 6 and 3 for packet data transmitter 102, and 7 and 3.5 for packet data transmitter 104.

Transmission opportunity manager 114 is configured to detect a change in the current packet data transmission credit value for any of packet data transmitters 100, 102, and 104, where, for a given packet data transmitter, the change results in the current packet data transmission credit value reaching a threshold value, whether or not the change results in the current packet data transmission credit value crossing the threshold value. Transmission opportunity manager 114 maintains, such as in a list of transmission opportunity weights 116, a separate transmission opportunity weight for each of packet data transmitters 100, 102, and 104, and adjusts the weights as follows. If the change in the current packet data transmission credit value for a given packet data transmitter is a decrease in the current packet data transmission credit value, transmission opportunity manager 114 is configured to increase, in accordance with a predefined weight increase function, the transmission opportunity weight of any, or all, of the packet data transmitters other than the given packet data transmitter. Similarly, if the change in the current packet data transmission credit value for a given packet data transmitter is an increase in the current packet data transmission credit value, transmission opportunity manager 114 is configured to decrease, in accordance with a predefined weight decrease function, the transmission opportunity weight of any, or all, of the packet data transmitters other than the given packet data transmitter.

Thus, in the current example, if the transmission opportunity weights of packet data transmitters 100, 102, and 104 are 2, 2, and 1, respectively, and the current packet data transmission credit value for packet data transmitter 100 decreases from 7 to 4, thus reaching (and passing) its 50% threshold value of 5, transmission opportunity manager 114 increases, in accordance with a predefined weight increase function, the transmission opportunity weight of packet data transmitters 102 and 104, such as by doubling their weights to 4 and 2, respectively.

If the transmission opportunity weights of packet data transmitters 100, 102, and 104 are 2, 2, and 1, respectively, and the current packet data transmission credit value for packet data transmitter 100 decreases from 7 to 2, thus reaching (and passing) both its 50% threshold value of 5 and its 25% threshold value of 2.5, transmission opportunity manager 114 increases, in accordance with a predefined weight increase function, the transmission opportunity weight of packet data transmitters 102 and 104, such as by doubling their weights for each of the thresholds, or quadrupling them to 8 and 4, respectively.

If the transmission opportunity weights of packet data transmitters 100, 102, and 104 are 4, 4, and 1, respectively, and the current packet data transmission credit value for packet data transmitter 102 increases from 3 to 5, thus reaching (and passing) its 25% threshold value of 3.5, transmission opportunity manager 114 decreases, in accordance with a predefined weight decrease function, the transmission opportunity weight of packet data transmitters 100 and 102, such as by halving their weights to 2 and 2, respectively.

If the transmission opportunity weights of packet data transmitters 100, 102, and 104 are 4, 4, and 1, respectively, and the current packet data transmission credit value for packet data transmitter 102 increases from 3 to 8, thus reaching (and passing) both its 25% threshold value of 3.5 and its 50% threshold value of 7, transmission opportunity manager 114 decreases, in accordance with a predefined weight decrease function, the transmission opportunity weight of packet data transmitters 100 and 102, such as by halving their weights for each of the thresholds, or quartering them to 1 and 1, respectively.

A transmission scheduler 118 is configured to provide each of packet data transmitters 100, 102, and 104 with an opportunity to transmit packet data via data transmission circuitry 106 during a scheduled transmission opportunity whose extent is proportionate to the transmission opportunity weight of the packet data transmitter. Thus, for example, where the transmission opportunity weights of packet data transmitters 100, 102, and 104 are 2, 2, and 1, respectively, transmission scheduler 118 provides packet data transmitters 100 and 102 with scheduled transmission opportunities that are twice as great, such as in length of time or in the number of whole packet transmission opportunities, as the scheduled transmission opportunity that is provided to packet data transmitter 104. Transmission scheduler 118 may provide packet data transmitters 100, 102, and 104 with their scheduled transmission opportunities in a round-robin fashion, in accordance with conventional techniques except as is otherwise described herein.

Any of the elements shown in FIG. 1 may be implemented in computer hardware and/or in computer software embodied in a non-transitory, computer-readable medium, in accordance with conventional techniques.

Figure 2:
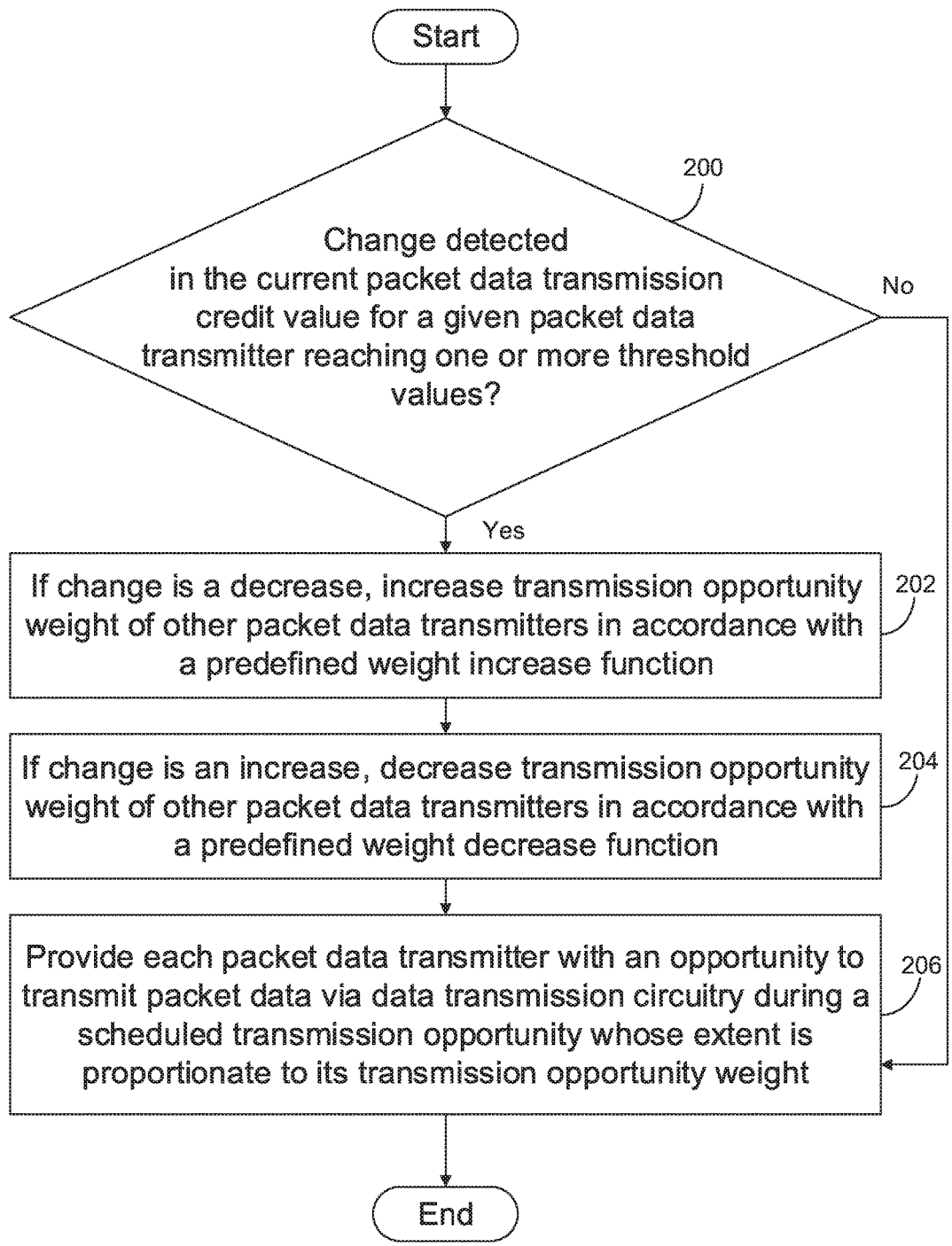
FIG. 2 is a flowchart depicting operational steps of the transmission scheduler of FIG. 1, in accordance with at least one embodiment of the present invention.

Reference is now made to FIG. 2 which is a flowchart illustration of an exemplary method of operation of the transmission scheduler 118 of FIG. 1, operative, in accordance with an embodiment of the invention. In FIG. 2, a change is detected in the current packet data transmission credit value for a given packet data transmitter in a group of packet data transmitters where, for the given packet data transmitter, the change results in the current packet data transmission credit value reaching one or more threshold values (step 200). If the change is a decrease in the current packet data transmission credit value for the given packet data transmitter, the transmission opportunity weight of any, or all, of the packet data transmitters other than the given packet data transmitter is increased, in accordance with a predefined weight increase function (step 202), such as by doubling for each threshold reached. If the change is an increase in the current packet data transmission credit value for the given packet data transmitter, the transmission opportunity weight of any, or all, of the packet data transmitters other than the given packet data transmitter is decreased, in accordance with a predefined weight decrease function (step 204), such as by halving for each threshold reached. Each of the packet data transmitters is provided with, or passed, an opportunity, or parameter, to transmit packet data via data transmission circuitry during a scheduled transmission opportunity whose extent is proportionate to the transmission opportunity weight of the packet data transmitter (step 206). The operational steps depicted in FIG. 2 may be repeated for multiple rounds of scheduled transmission opportunities that are provided to the group of packet data transmitters.

The transmission scheduler 118 of FIG. 1 and method of FIG. 2 may be further appreciated in the context of FIG. 3, which shows a table of current packet data transmission credit values and transmission opportunity weights for posted, non-posted, and response channels respectively in a Peripheral Component Interconnect Express (PCIe) computer architecture after each of eleven rounds of round-robin scheduled transmission opportunities. In the example shown in FIG. 3, each channel has a starting packet data transmission credit value of 10 data packets, which is also the baseline packet data transmission credit value of each channel; each channel has a starting transmission opportunity weight of 1; and each channel has threshold values at 50% and 25% of their baseline packet data transmission credit values, or 5 and 2.5 respectively. After each of rounds 1-5, the transmission opportunity weights are unchanged despite changes in current packet data transmission credit values, as no change results in current packet data transmission credit value reaching a threshold value. After round 6, the current packet data transmission credit value of the posted channel decreases to reach the 50% threshold value of 5, and therefore the transmission opportunity weights of the non-posted and completion channels are both doubled to 2. After round 9, the current packet data transmission credit value of the posted channel decreases to reach (and pass) the 25% threshold value of 2.5, and therefore the transmission opportunity weights of the non-posted and completion channels are both doubled again to 4. After round 10, the current packet data transmission credit value of the posted channel increases to reach (and pass) the 25% threshold value of 2.5, and therefore the transmission opportunity weights of the non-posted and completion channels are both halved to 2. Finally, after round 11, the current packet data transmission credit value of the posted channel increases to reach (and pass) the 50% threshold value of 5, and therefore the transmission opportunity weights of the non-posted and completion channels are both halved again to 1.

Figure 4:
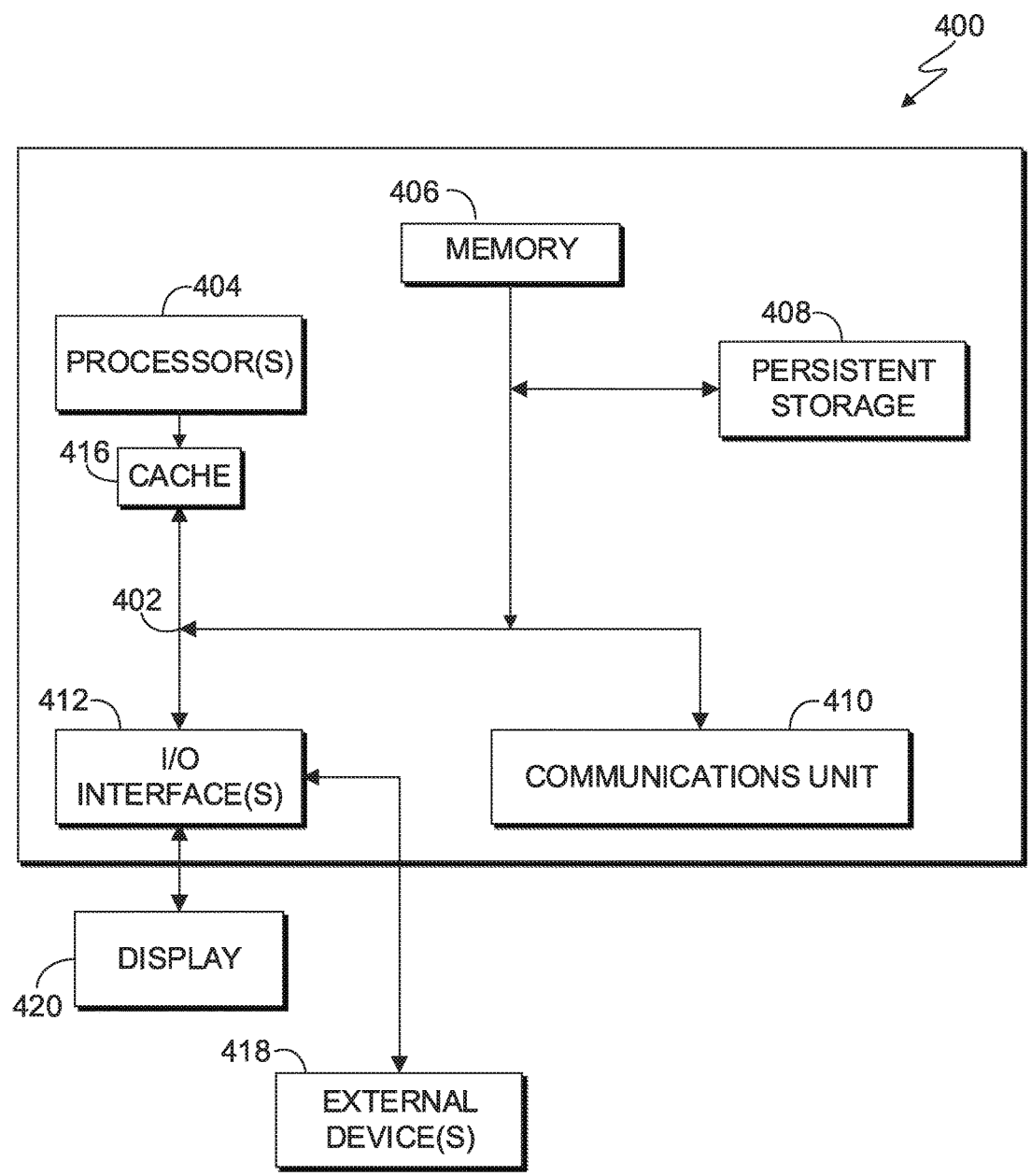
FIG. 4 is a block diagram of components of an operational apparatus suitable for executing the transmission scheduler of FIG. 1, in accordance with at least one embodiment of the present invention.

FIG. 4 is a block diagram depicting components of a computer 400 suitable for executing the transmission scheduler 118. FIG. 4 displays the computer 400, the one or more processor(s) 404 (including one or more computer processors), the communications fabric 402, the memory 406, the RAM 416, the cache 416, the persistent storage 408, the communications unit 410, the I/O interfaces 412, the display 420, and the external devices 418. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the cache 416, the computer processor(s) 404, the memory 406, the persistent storage 408, the communications unit 410, and the input/output (I/O) interface(s) 412. The communications fabric 402 may be implemented with any architecture suitable for passing data and/or control information between the processors 404 (e.g., microprocessors, communications processors, and network processors, etc.), the memory 406, the external devices 418, and any other hardware components within a system. For example, the communications fabric 402 may be implemented with one or more buses or a crossbar switch.

The memory 406 and persistent storage 408 are computer readable storage media. In the depicted embodiment, the memory 406 includes a random access memory (RAM). In general, the memory 406 may include any suitable volatile or non-volatile implementations of one or more computer readable storage media. The cache 416 is a fast memory that enhances the performance of computer processor(s) 404 by holding recently accessed data, and data near accessed data, from memory 406.

Program instructions for the transmission scheduler 118 may be stored in the persistent storage 408 or in memory 406, or more generally, any computer readable storage media, for execution by one or more of the respective computer processors 404 via the cache 416. The persistent storage 408 may include a magnetic hard disk drive. Alternatively, or in addition to a magnetic hard disk drive, the persistent storage 408 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 410, in these examples, provides for communications with other data processing systems or devices. In these examples, the communications unit 410 may include one or more network interface cards. The communications unit 410 may provide communications through the use of either or both physical and wireless communications links. The transmission scheduler 118 may be downloaded to the persistent storage 408 through the communications unit 410. In the context of some embodiments of the present invention, the source of the various input data may be physically remote to the computer 400 such that the input data may be received and the output similarly transmitted via the communications unit 410.

The I/O interface(s) 412 allows for input and output of data with other devices that may operate in conjunction with the computer 400. For example, the I/O interface 412 may provide a connection to the external devices 418, which may include a keyboard, keypad, a touch screen, and/or some other suitable input devices. External devices 418 may also include portable computer readable storage media, for example, thumb drives, portable optical or magnetic disks, and memory cards. Software and data used to practice embodiments of the present invention may be stored on such portable computer readable storage media and may be loaded onto the persistent storage 408 via the I/O interface(s) 412. The I/O interface(s) 412 may similarly connect to a display 420. The display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
identifying, by one or more computer processors, a current packet data transmission credit value, said current packet data transmission credit value being assigned to a first packet data transmitter of a plurality of packet data transmitters that are managed, at least in part, by a transmission scheduler;
identifying, by said one or more computer processors, a value change, said change being in said current packet data transmission credit value, said change being that said current packet data transmission credit value has exceeded a threshold value, said threshold value being relative to a baseline packet transmission credit value of said first packet data transmitter;
responsive to said change being a decrease in said current packet data transmission credit value, increasing, by said one or more computer processors, a transmission opportunity weight of every other packet data transmitter of said plurality of packet data transmitters by an amount, wherein each data packet data transmitter is associated with a respective transmission opportunity weight;
responsive to said change being an increase in said current packet data transmission credit value, decreasing, by said one or more computer processors, said transmission opportunity weight of every other packet data transmitter of said plurality of packet data transmitters by said amount; and
passing, by said one or more computer processors, to each packet data transmitter of said plurality of packet data transmitters a respective parameter, said respective parameter directing said packet data transmitter to transmit packet data via data transmission circuitry during a respective scheduled transmission opportunity, the extent of said respective parameter being proportional to said transmission opportunity weight.

2. The computer-implemented method of claim 1, wherein increasing said transmission opportunity weight of every other packet data transmitter of said plurality of packet data transmitters comprises doubling said respective transmission opportunity weight.

3. The computer-implemented method of claim 1, wherein decreasing said transmission opportunity weight of every other packet data transmitter of said plurality of packet data transmitters comprises halving said respective transmission opportunity weight.

4. The computer-implemented method of claim 1, wherein increasing said transmission opportunity weight of every other packet data transmitter of said plurality of packet data transmitters is responsive to said change being at a second threshold, said second threshold being relative to said baseline packet transmission credit value of said first packet data transmitter, said second threshold being distinct from said threshold value.

5. The computer-implemented method of claim 1, wherein decreasing said transmission opportunity weight of every other packet data transmitter of said plurality of packet data transmitters is responsive to said change being at a second threshold, said second threshold being relative to said baseline packet transmission credit value of said first packet data transmitter, said second threshold being distinct from said threshold value.

6. The computer-implemented method of claim 1, wherein increasing said transmission opportunity weight of every other packet data transmitter of said plurality of packet data transmitters comprises quadrupling said respective transmission opportunity weight.

7. The computer-implemented method of claim 1, wherein decreasing said transmission opportunity weight of every other packet data transmitter of said plurality of packet data transmitters comprises quartering said respective transmission opportunity weight.

8. A computer program product comprising:
one or more computer readable storage devices and program instructions stored on said one or more computer readable storage devices, said program instructions comprising instructions to:
identify a current packet data transmission credit value, said current packet data transmission credit value being assigned to a first packet data transmitter of a plurality of packet data transmitters that are managed, at least in part, by a transmission scheduler;
identify a value change, said change being in said current packet data transmission credit value, said change being that said current packet data transmission credit value has exceeded a threshold value, said threshold value being relative to a baseline packet transmission credit value of said first packet data transmitter;
responsive to said change being a decrease in said current packet data transmission credit value, increase a transmission opportunity of every other packet data transmitter of said plurality of packet data transmitters by an amount, wherein each data packet data transmitter is associated with a respective transmission opportunity weight;
responsive to said change being an increase in said current packet data transmission credit value, decrease said transmission opportunity weight of every other packet data transmitter of said plurality of packet data transmitters by said amount; and
pass to each packet data transmitter of said plurality of packet data transmitters a respective parameter, said respective parameter directing said packet data transmitter to transmit packet data via data transmission circuitry during a respective scheduled transmission opportunity, the extent of said respective parameter being proportional to said transmission opportunity weight.

9. The computer program product of claim 8, wherein said instructions to increase said transmission opportunity weight of every other packet data transmitter of said plurality of packet data transmitters comprise instructions to double said respective transmission opportunity weight.

10. The computer program product of claim 8, wherein said instructions to decrease said transmission opportunity weight of every other packet data transmitter of said plurality of packet data transmitters comprise instructions to halve said respective transmission opportunity weight.

11. The computer program product of claim 8, wherein said instructions to increase said transmission weight of every other packet data transmitter of said plurality of packet data transmitters is responsive to said change being at a second threshold, said second threshold being relative to said baseline packet transmission credit value of said first packet data transmitter, said second threshold being distinct from said threshold value.

12. The computer program product of claim 8, wherein said instructions to decrease a transmission weight of every other packet data transmitter of said plurality of packet data transmitters is responsive to said change being at a second threshold, said second threshold being relative to said baseline packet transmission credit value of said first packet data transmitter, said second threshold being distinct from said threshold value.

13. The computer program product of claim 8, wherein said instructions to increase said transmission opportunity weight of every other packet data transmitter of said plurality of packet data transmitters comprise instructions to quadruple said respective transmission opportunity weight.

14. The computer program product of claim 8, wherein said instructions to decrease said transmission opportunity weight of every other packet data transmitter of said plurality of packet data transmitters comprise instructions to quarter said respective transmission opportunity weight.

15. A computer system comprising:
   one or more computer processors;
   one or more computer readable storage devices;
   computer program instructions; and
   said computer program instructions being stored on said computer readable storage devices for execution by at least one of said one or more processors, said computer program instructions comprising instructions to:
     identify a current packet data transmission credit value, said current packet data transmission credit value being assigned to a first packet data transmitter of a plurality of packet data transmitters that are managed, at least in part, by a transmission scheduler;
     identify a value change, said change being in said current packet data transmission credit value, said change being that said current packet data transmission credit value has exceeded a threshold value, said threshold value being relative to a baseline packet transmission credit value of said first packet data transmitter;
     responsive to said change being a decrease in said current packet data transmission credit value, increase a transmission opportunity of every other packet data transmitter of said plurality of packet data transmitters by an amount, wherein each data packet data transmitter is associated with a respective transmission opportunity weight;
     responsive to said change being an increase in said current packet data transmission credit value, decrease said transmission opportunity weight of every other packet data transmitter of said plurality of packet data transmitters by said amount; and
     pass to each packet data transmitter of said plurality of packet data transmitters a respective parameter, said respective parameter directing said packet data transmitter to transmit packet data via data transmission circuitry during a respective scheduled transmission opportunity, the extent of said respective parameter being proportional to said transmission opportunity weight.

16. The computer system of claim 15, wherein said instructions to increase said transmission opportunity weight of every other packet data transmitter of said plurality of packet data transmitters comprise instructions to double said respective transmission opportunity weight.

17. The computer system of claim 15, wherein said instructions to decrease said transmission opportunity weight of every other packet data transmitter of said plurality of packet data transmitters comprise instructions to halve said respective transmission opportunity weight.

18. The computer system of claim 15, wherein said instructions to decrease a transmission weight of every other packet data transmitter of said plurality of packet data transmitters is responsive to said change being at a second threshold, said second threshold being relative to said baseline packet transmission credit value of said first packet data transmitter, said second threshold being distinct from said threshold value.

19. The computer system of claim 15, wherein said instructions to decrease a transmission weight of every other packet data transmitter of said plurality of packet data transmitters is responsive to said change being at a second threshold, said second threshold being relative to said baseline packet transmission credit value of said first packet data transmitter, said second threshold being distinct from said threshold value.

20. The computer system of claim 15, wherein said instructions to increase said transmission opportunity weight of every other packet data transmitter of said plurality of packet data transmitters comprise instructions to quadruple said respective transmission opportunity weight.

* * * * *